United States Patent
Guldimann et al.

(10) Patent No.: US 9,945,978 B2
(45) Date of Patent: Apr. 17, 2018

(54) LIGHT CURTAIN COMPONENT

(71) Applicant: PILZ AUSLANDSBETEILIGUNGEN GMBH, Ostfildern (DE)

(72) Inventors: Dominik Guldimann, Bad Ragaz (CH); Roger Loop, Bad Ragaz (CH)

(73) Assignee: PILZ AUSLANDSBETEILIGUNGEN GMBH, Ostfildern (DE)

(*) Notice: Subject to any disclaimer, the term of this patent is extended or adjusted under 35 U.S.C. 154(b) by 181 days.

(21) Appl. No.: 14/961,968

(22) Filed: Dec. 8, 2015

(65) Prior Publication Data
US 2016/0139297 A1  May 19, 2016

Related U.S. Application Data

(63) Continuation of application No. PCT/EP2014/062008, filed on Jun. 10, 2014.

(30) Foreign Application Priority Data

Jun. 13, 2013  (DE) .................. 10 2013 106 185

(51) Int. Cl.
G01V 8/20  (2006.01)
F16P 3/14  (2006.01)

(52) U.S. Cl.
CPC ............ *G01V 8/20* (2013.01); *F16P 3/144* (2013.01)

(58) Field of Classification Search
CPC .................. G01V 8/20; F16P 3/144
See application file for complete search history.

(56) References Cited

U.S. PATENT DOCUMENTS 6,294,777 B1  9/2001 Shteynberg et al.
2010/0171028 A1  7/2010 Wong et al.
2016/0240412 A1*  8/2016 Kodama .......... H01L 21/67265

FOREIGN PATENT DOCUMENTS

| DE | 10 2010 008 895 A1 | 8/2011 |
|---|---|---|
| EP | 0 097 317 A2 | 1/1984 |
| JP | 5-505017 | 7/1993 |
| JP | 2002-539603 | 11/2002 |
| JP | 2003-178655 | 6/2003 |

(Continued)

OTHER PUBLICATIONS

English language translation of International Preliminary Report on Patentability (Chapter 1) for PCT/EP2014/062008; dated Dec. 15, 2015; 8 pp.

(Continued)

*Primary Examiner* — Tony Ko
(74) *Attorney, Agent, or Firm* — Harness, Dickey & Pierce, P.L.C.

(57) ABSTRACT

A light curtain component comprising a housing which extends essentially along a longitudinal direction, and having a plurality of optoelectronic emission or reception elements which are arranged in the housing and are oriented toward an upper side of the housing, and which are separated from one another along the longitudinal direction. The housing comprises, on a front side, a first planar front surface which is arranged at an angle (α) of less than 90°, preferably equal to 45°, with respect to the longitudinal direction. This first planar front surface allows joining two such light curtain components flush with one another in a corner, without undesired formation of dead or blind zones taking place.

16 Claims, 7 Drawing Sheets

(56) References Cited

FOREIGN PATENT DOCUMENTS

| JP | 2006-179960 | 7/2006 |
|----|-------------|--------|
| WO | WO 91/13286 | 9/1991 |
| WO | 00/54077 | 9/2000 |
| WO | WO 00/54077 | 9/2000 |

OTHER PUBLICATIONS

Abstract for Weber, A., Turck GmbH & Co. KG; Sicher ohne blinden Fleck (Safe without a blind spot); A&D, Vorsprung Automation, 5th Edition 2013; pp. 49-51.
International Search Report for PCT/EP2014/062008; dated Feb. 18, 2015; 5 pp.
German language Written Opinion for PCT/EP2014/062008; 6 pp.

\* cited by examiner

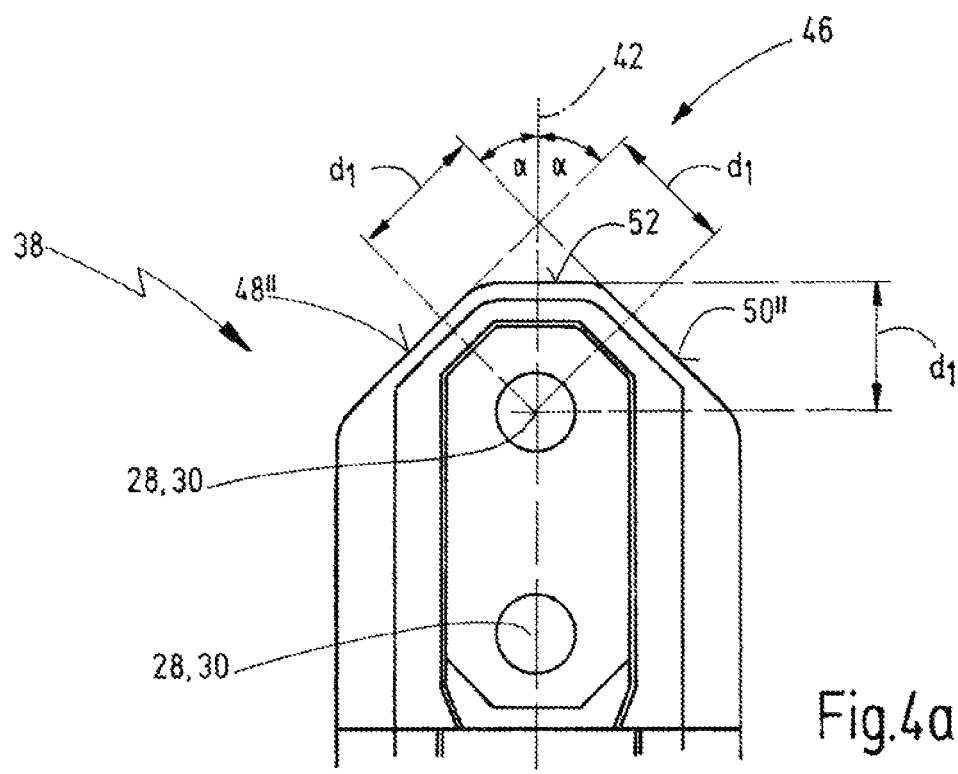
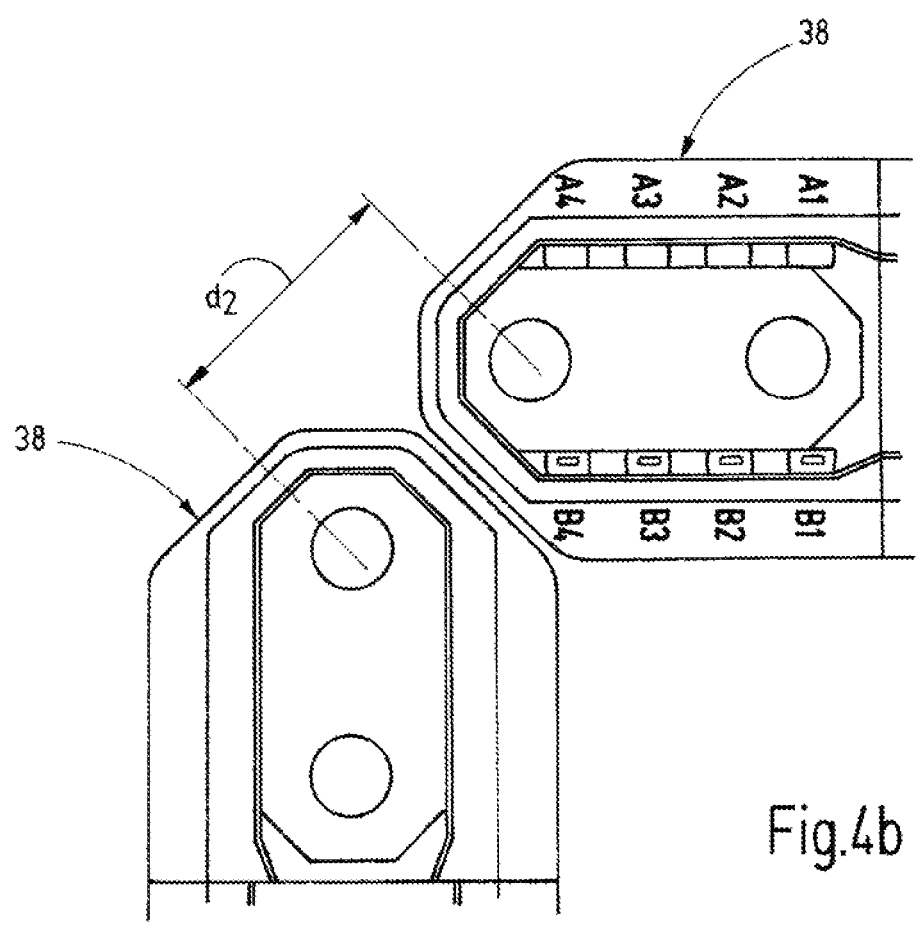

LIGHT CURTAIN COMPONENT

CROSS-REFERENCES TO RELATED APPLICATIONS

This application is a continuation of international patent application PCT/EP2014/062008, filed on Jun. 10, 2014 designating the U.S., which international patent application has been published in German language and claims priority from German patent application DE 10 2013 106 185.0, filed on Jun. 13, 2013. The entire contents of these priority applications are incorporated herein by reference.

BACKGROUND OF THE INVENTION

This disclosure relates to a light curtain component comprising a housing which extends essentially along a longitudinal direction, and having a plurality of optoelectronic emission or reception elements which are arranged in the housing and are oriented toward an upper side of the housing, and which are separated from one another along the longitudinal direction. The present invention furthermore relates to a light curtain comprising such a light curtain component.

Such light curtains are often also referred to as a photoelectric barrier arrangement or light curtain protection device. They are mostly used to safeguard hazardous regions. One frequent application example relates to the safeguarding of machines or industrial robots operating in an automated fashion. In the case of modern machines or industrial robots operating in an automated fashion, which move at considerable speeds, collisions generally lead to serious damage both to the machines or robots and to the workpieces being handled by them. This can lead to expensive production downtimes. The safety of people interacting with the machines or robots operating in an automated fashion also has the highest priority. For modern industrial robots and other machines with moving machine elements, the movement of which represents a risk for persons and other objects, it is therefore necessary to use protective devices to prevent a collision between the moving machine elements and a foreign object. To this end, the light curtains are usually arranged around the hazardous regions in order to virtually enclose these regions. As soon as a person breaks a photoelectric barrier generated by a light curtain, a shutdown signal is preferably generated, with which the dangerous working movement of the machine is stopped or the machine is brought into a safe state.

To this end, light curtains usually have a plurality of light curtain rails lying opposite one another, which interact with one another during operation of the light curtain. A light curtain rail usually contains a multiplicity of light emitters, preferably in the form of laser diodes and/or infrared diodes for emitting laser or infrared beams. A light curtain rail lying opposite this, which functions as a counterpart, contains a multiplicity of corresponding light receivers, with the aid of which the arrival of the laser or infrared beams can be detected. As soon as one of these laser or light beams is broken by a foreign object, the machine is thereupon switched off or put into a safe state with the aid of suitable control devices.

In order to ensure the greatest possible safety, so-called dead or blind zones, i.e. zones which are not covered by the light curtain, should absolutely be avoided. In the case of light curtains, which are usually assembled from individual rod-shaped light curtain rails to form a rectangular light curtain arrangement, this is often difficult to ensure particularly in the corners of the light curtain arrangement. The emission or reception elements are usually arranged at equal distances in the housings of the individual light curtain rails. In the corners of a light curtain arrangement where the ends of two light curtain rails meet one another at a right angle, however, there is usually an interruption or modification of the so-called pitch (the distance between two neighboring emission or reception elements), which leads to safety reductions in these regions.

The reason for the modified distance results from the fact that the light curtain rails meeting one another in the corners usually cannot be mounted close enough to one another because of the housing.

One solution to this problem consists in arranging the light curtain rails which meet one another in the corners overlapping with one another. This, however, requires the light curtain rails to be offset parallel to one another, which is usually undesirable for reasons of safety technology.

Another solution to this problem has been proposed by Turck GmbH & Co. KG (see Weber, A.: "Sicher ohne blinden Fleck" [Safe without a blind spot], in A & D, Vorsprung Automation, 5$^{th}$ Edition 2013, pp. 49-51). This solution is represented schematically in FIG. 6. The light curtain arrangement 100 proposed by Turck GmbH & Co. KG comprises two light curtain rails 102, 102' arranged at a right angle to one another, each of which has a multiplicity of emission or reception elements 104, 104'. In order to keep the offset between the emission or reception elements 104, 104' arranged in the corners as small as possible, in this solution the front ends 106, 106' are not covered by the housing. Dead or blind zones can therefore be avoided in the corners. This solution, however, has the disadvantage that, because of the lack of housing coverage on the front sides 106, 106', the front sides 106, 106' of the individual light curtain rails 102, 102' are not safeguarded against mechanical impact. Therefore, particularly when mounting the light curtain, but also during operation, undesired damage can occur relatively easily on the front sides 106, 106' of the light curtain rails 102, 102'.

SUMMARY OF THE INVENTION

It is an object to provide a light curtain component with which dead or blind zones in the corners of a light curtain arrangement can be avoided effectively, but without entailing the aforementioned disadvantages of reduced mechanical safety.

According to a first aspect, a light curtain component is presented, comprising: (i) a housing which extends essentially along a longitudinal direction, wherein the housing comprises an upper side, which extends parallel to the longitudinal direction, and a front side, which extends transversely to the upper side, and (ii) a plurality of optoelectronic emission or reception elements which are arranged in the housing and are oriented toward the upper side of the housing, wherein the plurality of optoelectronic emission or reception elements are separated from one another along the longitudinal direction, wherein the housing further comprises, on the front side, a first planar front surface, a second planar front surface, and a third planar front surface, wherein the first planar front surface extends transversely to the upper side and is arranged at an angle of 45° with respect to the longitudinal direction, wherein the second planar front surface extends transversely to the upper side and is arranged at an angle of 45° with respect to the longitudinal direction, wherein the third planar front surface extends transversely to the upper side and is oriented orthogonally to the longitudinal direction, and wherein third planar front surface is arranged locally in between the first planar front surface and the second planar front surface, such that the front side has an essentially trapezoidal shape in a plan view, and wherein one of the optoelectronic emission or reception elements, which is arranged in the housing spatially closest to the front side, has an equally large first distance from each of the first, the second and the third planar front surface, and wherein said first distance is at most half as large as a second distance between two optoelectronic emission or reception elements being arranged directly next to one another in the housing.

According to a second aspect, a light curtain component is presented, comprising: (i) a housing which extends essentially along a longitudinal direction, wherein the housing comprises an upper side, which extends parallel to the longitudinal direction, and a front side, which extends transversely to the upper side, and (ii) a plurality of optoelectronic emission or reception elements which are arranged in the housing and are oriented toward the upper side of the housing, wherein the plurality of optoelectronic emission or reception elements are separated from one another along the longitudinal direction, wherein the housing further comprises, on the front side, a first planar front surface and a second planar front surface, wherein the first planar front surface extends transversely to the upper side and is arranged at an angle of 45° with respect to the longitudinal direction, wherein the second planar front surface extends transversely to the upper side and is arranged at an angle of 45° with respect to the longitudinal direction, and wherein the second planar front surface extends orthogonally to the first planar front surface, and wherein one of the optoelectronic emission or reception elements, which is arranged in the housing spatially closest to the front side, has an equally large first distance from each of the first planar front surface and the second planar front surface, and wherein said first distance is at most half as large as a second distance between two optoelectronic emission or reception elements being arranged directly next to one another in the housing.

According to a third aspect, a light curtain component is presented, comprising: (i) a housing which extends essentially along a longitudinal direction, wherein the housing comprises an upper side, which extends parallel to the longitudinal direction, and a front side, which extends transversely to the upper side, and (ii) a plurality of optoelectronic emission or reception elements which are arranged in the housing and are oriented toward the upper side of the housing, wherein the plurality of optoelectronic emission or reception elements are separated from one another along the longitudinal direction, wherein the further housing comprises, on the front side, a first planar front surface, wherein the first planar front surface extends transversely to the upper side and is arranged at an angle of 45° with respect to the longitudinal direction, and wherein one of the optoelectronic emission or reception elements, which is arranged in the housing spatially closest to the front side, has a first distance from the first planar front surface, and wherein said first distance is at most half as large as a second distance between two optoelectronic emission or reception elements being arranged directly next to one another in the housing.

In the herein presented light curtain component the first planar front surface is according to all three above-mentioned aspects of the invention, instead of being oriented orthogonally to the longitudinal direction of the housing as is otherwise conventional, oriented obliquely with respect to the longitudinal direction, i.e. at an angle of less than 90°. The first planar front surface preferably extends orthogonally to the upper side of the housing and obliquely with respect to the longitudinal direction of the housing. This modification makes it possible to join two such light curtain components flush with one another in a corner, without undesired formation of dead or blind zones taking place, as will be explained by way of example with the aid of the figures below. In contrast to the above-described solution known from the prior art, the housing is nevertheless continued on the front side as well, so that mechanical support against damage is also ensured here. Such a chamfered front surface can moreover also be produced very easily, so that there are no increases, or only insignificant increases, in the production costs of such a light curtain component.

The angle between the longitudinal direction and the first planar front surface preferably has a value of 45°.

Two light curtain components of this type can therefore be connected to one another relatively simply by joining together the respective first planar front surfaces in order to form a corner, i.e. a 90° angle. Compared with bluntly placing together two light curtain components with front surfaces oriented orthogonally to the longitudinal direction, as is the case in the prior art, because of the chamfered front sides the emission and reception elements can be arranged closer to these front sides. The distance between the front side, or the first planar front surface, and the closest lying emission or reception element can therefore be minimized. This in turn proves advantageous in terms of avoiding dead or blind zones.

The distance between the first planar front surface and one of the optoelectronic emission or reception elements, which is arranged in the housing and lies spatially closest to the front side, is at most half as large as the distance between two optoelectronic emission or reception elements lying directly next to one another in the housing.

If two light curtains of this type are joined together to form a corner, no increase of the pitch takes place in the corner, i.e. no increase in the distance between two neighboring emission or reception elements.

Preferably, the distance between the first planar front surface and one of the optoelectronic emission or reception elements, which is arranged in the housing and lies spatially closest to the front side, is precisely half as large as the distance between two optoelectronic emission or reception elements lying directly next to one another in the housing. In this case, no modification of the pitch takes place in the corner, i.e. no modification of the distance between two neighboring emission or reception elements. This is because, so long as the two light curtain components are placed against one another flush with the respective first planar front surfaces, the two emission or reception elements which lie spatially closest to the respective front side have the same distance from one another (pitch) as that which occurs for the other emission or reception elements arranged next to one another.

The housing may furthermore comprise, on the front side, a second planar front surface which extends transversely to the upper side and which makes an angle of less than 90° with the longitudinal direction. Preferably, this angle is also selected to be 45°.

The second planar front surface is preferably arranged orthogonally to the first planar front surface. The two planar front surfaces also preferably extend orthogonally to the upper side of the housing. Furthermore, the two front surfaces are preferably configured to be of the same size. This leads to a symmetrical front side. By virtue of the second planar front surface provided according to this refinement, the flexibility of the light curtain component is additionally increased. This is because, in order to form a corner, a further light curtain component of this type may be placed both adjacent to the first planar front surface and adjacent to the second planar front surface, which extends transversely thereto.

Preferably, one of the optoelectronic emission or reception elements, which is arranged in the housing and lies spatially closest to the front side, may have an equally large distance from the first and second planar front surfaces.

In the aforementioned example, in which two light curtain components of this type are assembled to form a corner, this thus results in the same light curtain properties, irrespective of whether the first or the second planar front surface is used as a contact surface between the two light curtain components. Since the distance between the optoelectronic emission or reception element lying closest to the front side and the first or second planar front surface is preferably selected to be half as large as the distance between two optoelectronic emission or reception elements directly next to one another in the housing, no modification of the pitch takes place in either case. In both cases, a corner of the light curtain which is free of dead zones or blind zones can thus be produced.

The housing may furthermore comprise, on the front side, a third planar front surface which extends transversely to the upper side, which is oriented orthogonally to the longitudinal direction, and which connects the first and second front surfaces to one another.

The third planar front surface is thus arranged spatially between the first and second planar front surfaces. Such a third planar front surface increases the flexibility of the light curtain component even further. This is because the light curtain can then also be placed with the third planar front surface on a corresponding front surface of a further light curtain component. The front side of the light curtain component therefore has three different bearing surfaces with which it can be connected to a further light curtain component of this type. Two light curtain components of this type can thus not only be arranged at an angle of 90° with respect to one another but also arranged flush with one another at an angle of 45° to one another. By virtue of the three planar front surfaces provided on the front side of the light curtain component, the front surface essentially has the shape of a trapezium without a base side as seen in a plan view from above.

Preferably, one of the optoelectronic emission or reception elements, which is arranged in the housing and lies spatially closest to the front side, also has an equally large distance from the first, second and third planar front surfaces. This distance is preferably again selected to he half as large as the distance between two optoelectronic emission or reception elements directly next to one another in the housing. According to this refinement, therefore, which of the three planar front surfaces of the light curtain component bears on the closest light curtain component of a light curtain frame is also unimportant. In all three possible cases, the pitch is not modified thereby, so that the placement of two light curtain components of this type against one other while being free of dead zones or blind zones is respectively possible.

In another refinement, the light curtain component is configured as a removable endpiece of a light curtain rail, and comprises at least one connecting element for connection to such a light curtain rail.

In this refinement, the light curtain component is thus not an entire light curtain rail but "only" a so-called end cap of a light curtain rail. Such end caps may be used as terminations of a light curtain, which are usually configured as hollow profiled sections. The end cap may, for example, be connected to such a hollow profiled section with the aid of screws. The advantage of such end caps is that "normal" light curtain rails can be used in order to produce a light curtain frame. The light curtain rails may be cut to length according to the size of the desired light curtain frame, and the endpieces may then be placed on the ends of the light curtain rail on both sides. Instead of screw connections, the connection between the end caps and the light curtain rail may, of course, also be ensured with the aid of other connecting elements, for example with a click system or a groove/featherkey connection.

The light curtain component mentioned above, having the aforementioned front surfaces extending obliquely or orthogonally with respect to the longitudinal direction may thus be either an entire light curtain rail or "only" an endpiece of such a light curtain rail. The second possibility, however, is preferred in terms of manufacturing technology for the reasons mentioned above.

It is to be understood that the features mentioned above and those yet to be explained below may be used not only in the combination respectively indicated, but also in other combinations or individually, without departing from the spirit and scope of the present disclosure.

BRIEF DESCRIPTION OF THE DRAWINGS

FIG. 4a shows a schematic representation of the light curtain component according to a third embodiment;

FIGS. 4b-4d show schematic representations of the light curtain component according to a third embodiment, in various assembly variants with a second light curtain component of this type;

FIG. 5b shows a detailed view of the endpiece of the light curtain rail shown in FIG. 5a.

DESCRIPTION OF PREFERRED EMBODIMENTS

Figure 1:
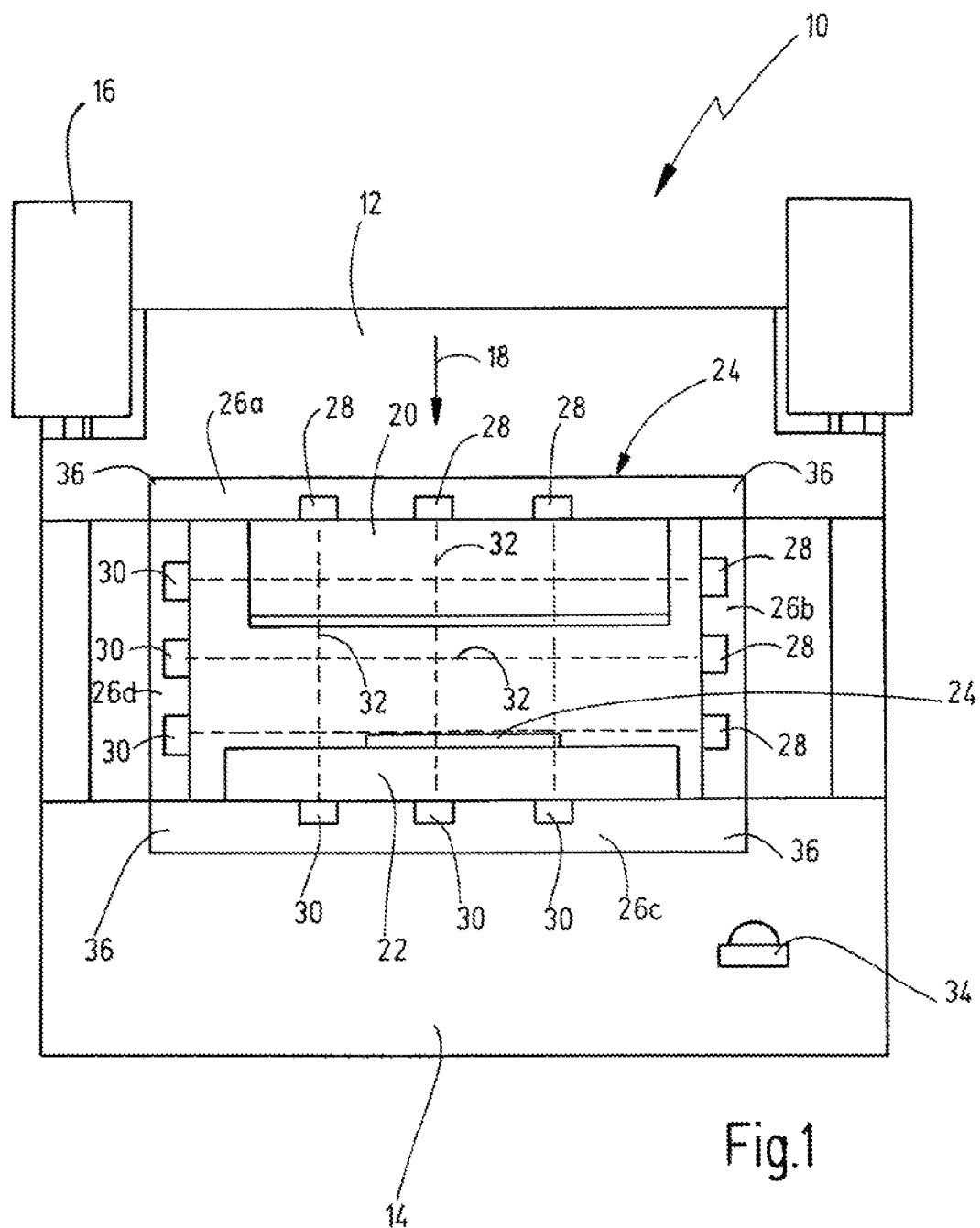
FIG. 1 shows a schematic representation of a bending press for illustration of an exemplary possible application of the light curtain component according to the disclosure.

In FIG. 1, a bending press which is denoted overall by the reference number 10 is shown as an exemplary machine operating in an automated fashion, for which the herein presented light curtain component may be used as part of a safety device for safeguarding the machine 10. It is, however, to be understood that the light curtain component according to the present disclosure may also be used as part of a safety device for various other possible applications, for example to safeguard other types of machines. The bending press 10 schematically represented in FIG. 1 is in the present case used only for schematic illustration and explanation of the basic functionality of a light curtain.

The bending press 10 shown in FIG. 1 has, in a manner known per se, a first machine part 12, in this case the upper machine part, and a second machine part 14, in this case the lower machine part. The upper machine part 12 can execute a working movement in the direction of an arrow 18 by means of a drive, which is schematically indicated here by the reference number 16.

A male bending die 20 is arranged on the upper machine part 12. There is a female die 22 on the lower machine part 14. The male bending die 20 and the female die 22 together form the pressing tools with which a workpiece 24 can be shaped. The workpiece 24 is, for example, a sheet-metal part here.

In order to safeguard the hazardous machine movement of the bending press 10, in the present case a light curtain device 24 is provided. This light curtain device 24 forms a light curtain frame which is composed of a plurality of light curtain rails 26a-d, pairs of which respectively lie opposite one another. The mutually opposing light curtain rails 26a, 26c and 26b, 26d interact with one another. Each of these light curtain rails 26a-d comprises a multiplicity of optoelectronic emission or reception elements 28, 30. The emission elements 28 are probably laser diodes and/or infrared diodes, with the aid of which laser or infrared beams 32 (here generally referred to as light beams 32) can be emitted. The reception elements 30 are usually light-sensitive sensors, with the aid of which the light beams 32 emitted by the emission elements 28 can be detected. In the present case, the light curtain rails 26a, b comprise a plurality of emission 28 and the light curtain rails 26c, d comprise a plurality of reception elements 30. In principle, however, it is also possible for both emission and reception elements 28, 30 to be arranged, for example alternately, in a light curtain rail 26a, b. For the function of the light curtain 24, it is of immense importance that the reception elements 30 lie exactly opposite their respectively assigned emission elements 28.

The emission and reception elements 28, 30 of the light curtain 24 are usually connected via corresponding signal lines to a control unit (not shown here) which evaluates the signals generated by the light curtain 24. The control unit can therefore detect the interruption of a light beam 32 and, as a function thereof, bring the machine 10 to a stop or into a safe state. The drive movement 18 of the machine 10 is stopped in particular, when the control unit establishes that one of the light beams 32 is interrupted at a time at which an interruption should not have taken place during normal operation. In practice, this may occur for example because of an operator of the bending press 10 inadvertently entering the movement path of the male bending die 20. In the event of such an interruption of a light beam 32, the control unit generates a so-called OSSD signal (Optical Safety Switching Device Signal).

The control unit is preferably a so-called PLC (programmable logic controller) which, by suitable measures, in particular a redundant diverse configuration, is allowed to control safety-critical processes. It may, for example, be a PSS3000 from Pilz GmbH & Co., Germany. For additional safety, an emergency stop button 34 may also be provided, which is likewise connected to the control unit and with the aid of the machine can also be switched off manually.

It is to be understood that, depending on the safety requirement, a distance which is as small as possible between the individual emission or reception elements 28, 30 must be ensured, in order to produce the fewest possible gaps between the light beams 32. This distance is conventionally referred to as the pitch. As already explained in the introduction, it is often difficult to maintain this pitch particularly in the corners 36 of a light curtain frame 24. In a number of light curtains known from the prior art, undesired dead or blind zones therefore occur in these corners, i.e. zones which cannot be monitored by the light curtain. It is clear that such dead or blind zones should absolutely be avoided for safety reasons.

Figure 2A:
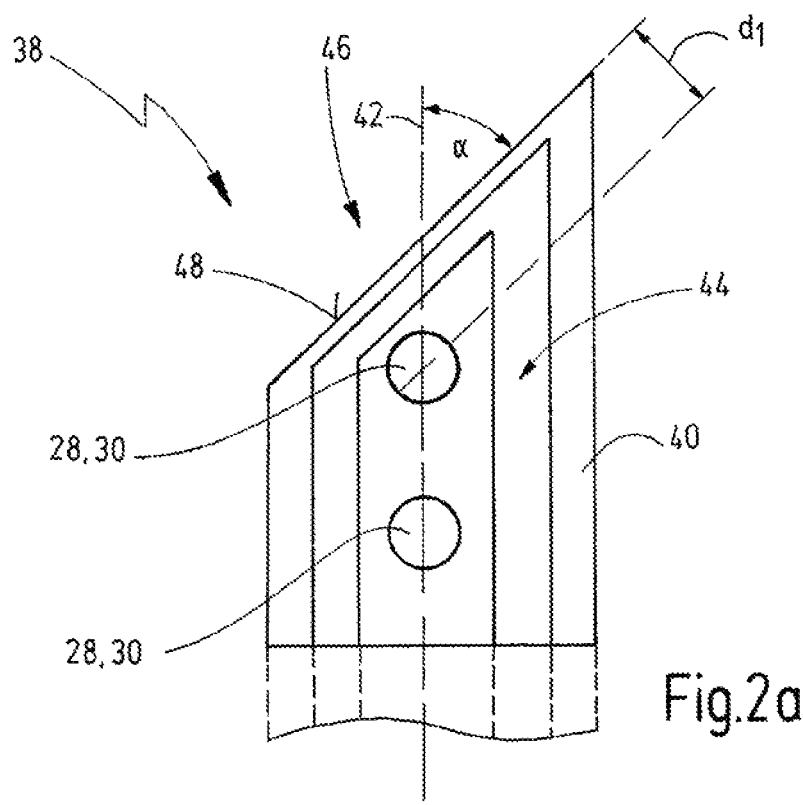
FIG. 2a shows a schematic representation of the light curtain component according to a first embodiment.

According to the present disclosure, this is assured by light curtains 24 whose ends have one or more chamfered front surfaces. FIG. 2a shows a first embodiment of a light curtain component, which is denoted therein overall by the reference number 38. This light curtain component 38 is preferably configured as an endpiece or so-called end cap which can be mounted on one end of a light curtain rail 24, as is shown in FIG. 5 and will be explained in more detail below. In principle, however, the light curtain component 38 may also be an end of a light curtain rail 26, which is inseparably connected to the rest of the light curtain rail 26.

The light curtain component 38 has a housing 40, in which the emission and reception elements 28, 30 are respectively arranged. The housing 40 is essentially used as a carrier frame for the emission and reception elements 28, 30, and in this function also acts as mechanical impact protection for the usually sensitive emission and reception elements 28, 30. With the aid of the housing 40, the light curtain component 38 is usually fastened to a corresponding mechanical carrier on the machine 10. The housing 40 extends essentially along a longitudinal direction 42. The emission or reception elements 28, 30 are preferably oriented toward an upper side 44 of the housing 40 separated from one another along the longitudinal direction 42. The distance $d_2$ between two neighboring emission or reception elements 28, 30 is preferably constant for the reasons mentioned above.

On the front side 46, which forms a free end of the light curtain component 38, according to the first embodiment, the housing 40 has a first planar front surface 48. Here, "planar" is not intended to be understood in the sense of a surface condition, but in the sense that the surface is in this case a two-dimensional surface. This first planar front surface 48 preferably extends orthogonally to the upper side 44, albeit obliquely, i.e. at an angle $\alpha$ of less than 90° with respect to the longitudinal direction 42 of the housing 40. By virtue of this front surface 48, extending obliquely with respect to the longitudinal direction 42, of the housing 40, the light curtain component 38 can be assembled more easily with a second light curtain component 38 of this type in order to form a corner of a light curtain frame 24. This is shown schematically in a plan view in FIG. 2b.

Preferably, the angle $\alpha$ between the longitudinal direction 42 and the first planar front surface 48 has a value of 45°.

Figure 2B:
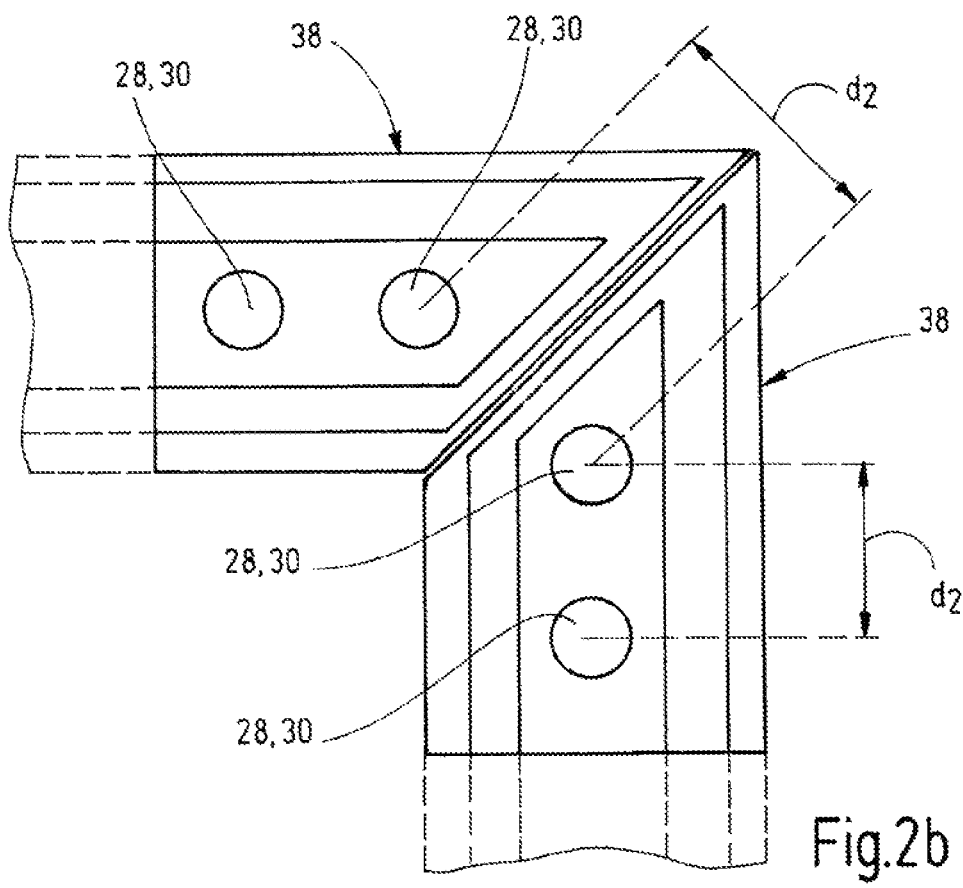
FIG. 2b shows a schematic representation of the light curtain component according to a first embodiment, in the state assembled with a second light curtain component of this type.

It is furthermore preferable that the distance $d_1$ between the emission or reception element 28, 30 which has the shortest distance from the first planar front surface 48 is selected to be at most half as large as the distance $d_2$ between two neighboring emission or reception elements 28, 30 of the light curtain component 38. Preferably, the distance $d_1$ is precisely half as large as the distance $d_2$. In this way, it is possible that, as shown in FIG. 2b, no modification of the pitch takes place even in the corners of the light curtain frame 24, and no dead or blind zones are therefore formed.

This is because if the first planar front surfaces 48 of two such light curtain components 38 are placed flush on one another, then the two emission or reception elements 28, 30 spatially closest to the respective front surface 48 are at the same distance $d_2$ from one another as neighboring emission or reception elements 28, 30 of a light curtain component 38. It is to be understood that the distance $d_1$ may even be selected to be shorter, i.e. less than $d_2/2$, in order to additionally increase the safety in the corners of a light curtain frame.

Figure 3A:
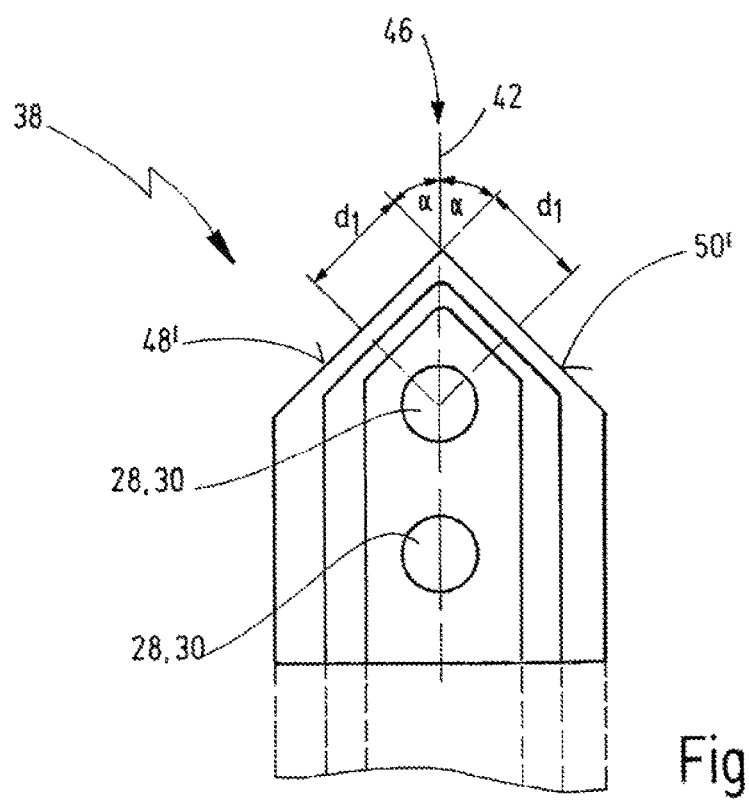
FIG. 3a shows a schematic representation of the light curtain component according to a second embodiment.

The flexibility of the light curtain component 38 may additionally be increased if, instead of only one of these planar front surfaces 48 extending obliquely with respect to the longitudinal direction 42, two such front surfaces 48', 50' are provided at the end on the housing 40. This is done according to a second embodiment of the light curtain component 38 as represented in FIG. 3. According to this second embodiment, the housing 40 preferably has two planar front surfaces on its front side 46, namely a first planar front surface 48' and a second planar front surface 50'. The two front surfaces 48', 50' again preferably extend perpendicularly to the upper side 44 of the housing 40. Here again, it is preferable for them respectively to make an angle α of less than 90° with the longitudinal direction 42. It is particularly preferred for this to be an angle of 45°. In this preferred case, the two front surfaces 48', 50' thus extend orthogonally to one another. When these sizes of the two front surfaces 48', 50' are equal, this leads to a symmetrical housing 40, the symmetry axis of which extends along the longitudinal direction 42.

Figure 3B:
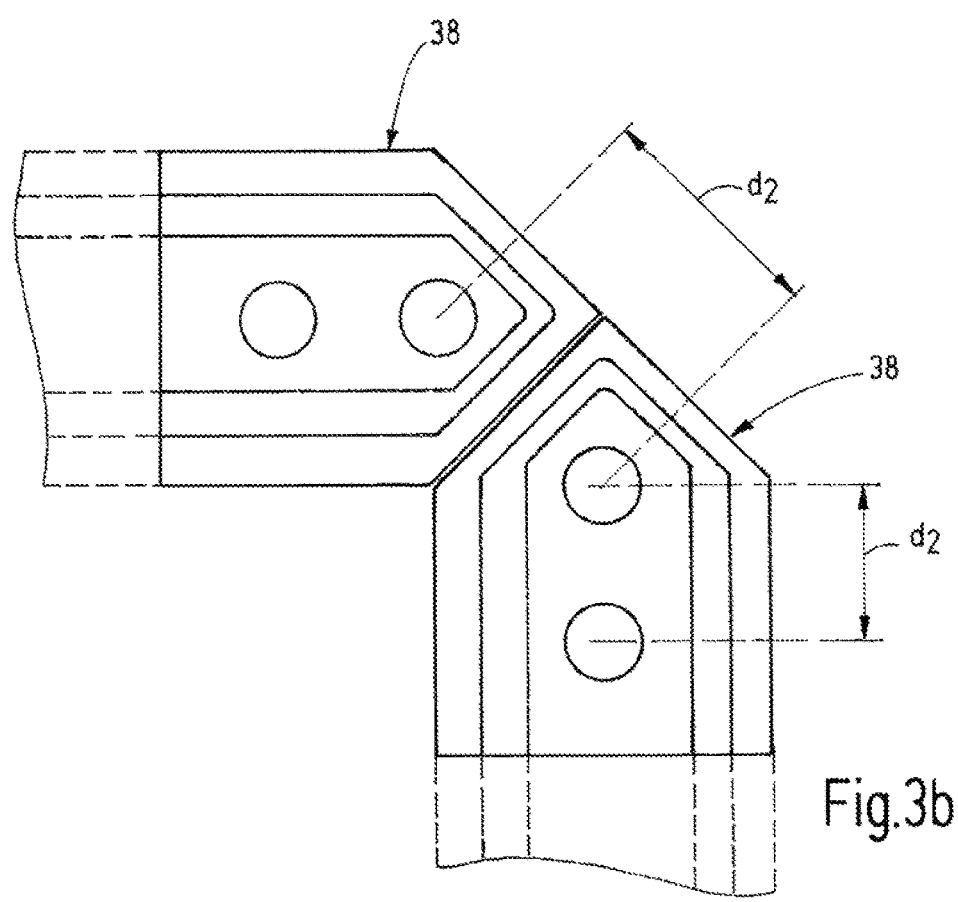
FIG. 3b shows a schematic representation of the light curtain component according to a second embodiment, in the state assembled with a second light curtain component of this type.

In a similar way as in the first embodiment shown in FIG. 2, according to the second embodiment it is also preferred for the distance d, between the emission or reception element 28, 30 lying spatially closest to the front side 26 of the housing 40 and one of the two planar front surfaces 48', 50' respectively to be selected to be at most half as large, preferably precisely half as large, as the distance $d_2$ between two emission or reception elements 28, 30 next to one another in the light curtain 38. According to the second exemplary embodiment shown in FIG. 3, it is also preferred for the two planar front surfaces 48', 50' respectively to be at the same distance $d_1$ from this closest emission or reception element 28, 30. Specifically, in order to form a corner of a light curtain frame 24, the light curtain component may then meet flush both with the first planar front surface 48' and with the second planar front surface 50' at a corresponding front surface 48' or 50' of a second light curtain component 38 of this type, without dead or blind zones of the light curtain thereby occurring in the region of the corner. This situation is schematically represented in FIG. 3b, in which case the lower light curtain component 38 connects with, or bears flush on, the second planar front surface 50' of the upper light curtain component 38 via the first planar front surface 48'. The converse would of course also be possible, so that according to this second embodiment there are two different possibilities for joining together two light curtain components 38 of this type.

In a third exemplary embodiment, which is shown in FIG. 4, a third planar front surface 52 is furthermore also provided on the front side 46 of the housing 40. This third planar front surface 52 preferably likewise extends orthogonally to the upper side 44 of the housing 40. In contrast to the first and second planar front surfaces 48", 50", however the third planar front surface 52 extends orthogonally to the longitudinal direction 42. The third planar front surface 42 is arranged spatially between the first planar front surface 48" and the second planar front surface 50". In other words, it connects these two planar front surfaces 48", 50" to one another, the edges extending between them preferably being rounded. In the plan view shown in FIG. 4a, this results in an essentially trapezoidal front side of the light curtain component 38. Even though strictly speaking this trapezium is missing a base side, it should nevertheless be understood here as being "essentially trapezoidal".

In order to avoid a pitch modification, in this third embodiment it is also preferred for the distance $d_1$ between the third planar front surface 52 and the spatially closest emission or reception element 28, 30 to be the same as the distance $d_1$ between this "last" emission or reception element 28, 30 and the planar front surfaces 48", 50".

Figure 4C:
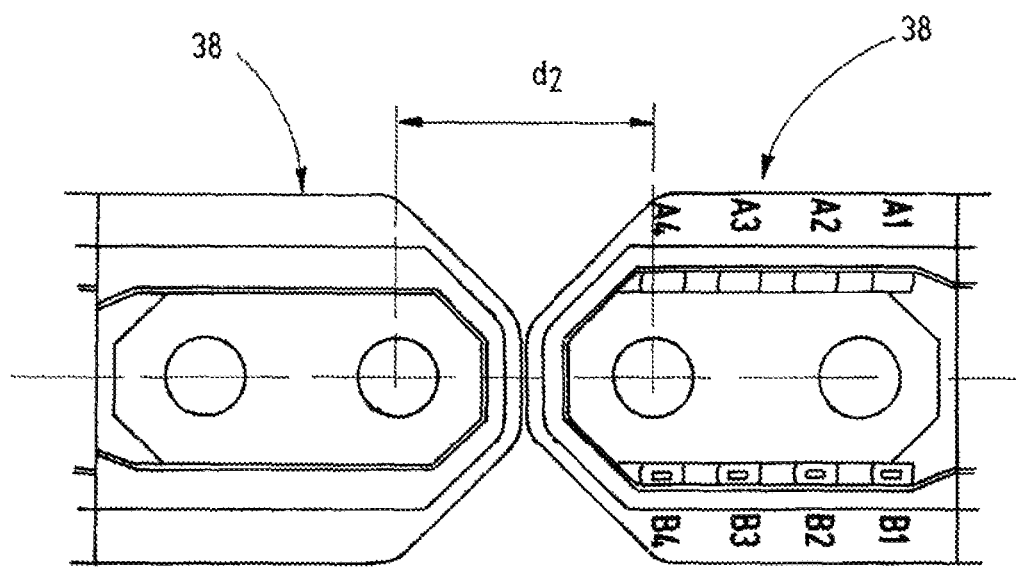
Figure 4D:
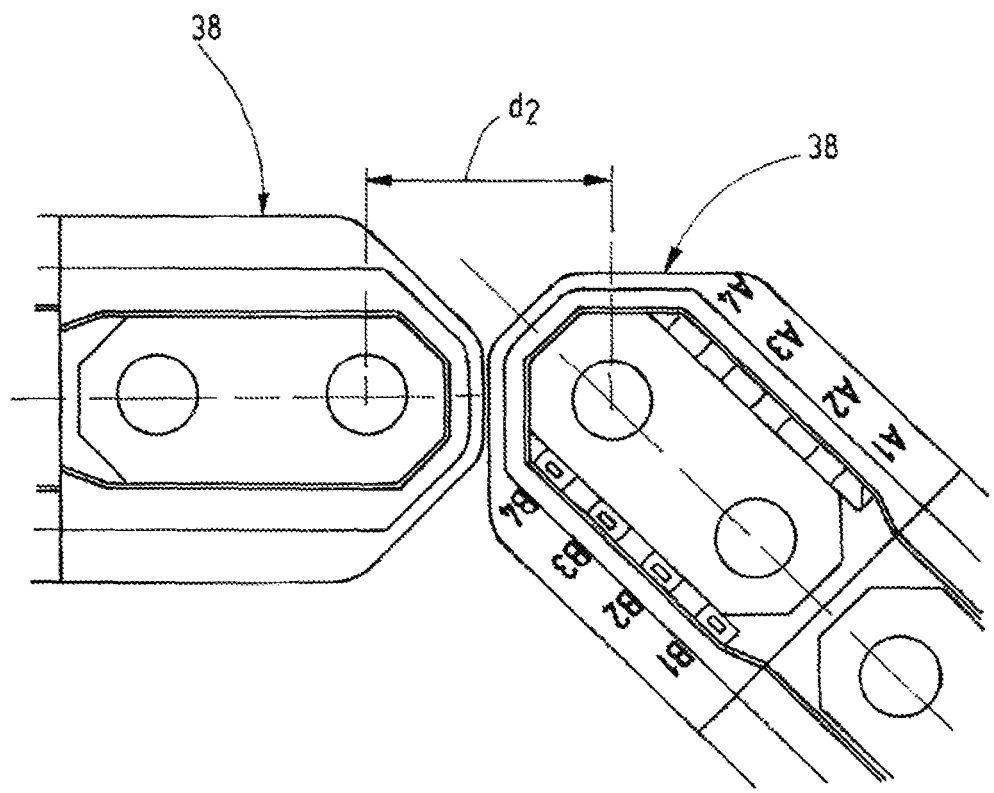

The greatest possible flexibility is achieved in the embodiment shown in FIG. 4. This is because two light curtain components 38 of this design can then be placed against one another in the widest variety of orientations, without this leading to a modification of the pitch. Three of the possible mutual orientations are shown by way of example in FIGS. 4b-4d. In FIG. 4b, the lower light curtain component 38 is arranged flush with its second planar front surface 50" on the first planar front surface 48" of the upper light curtain component 38. In FIG. 4c, the two light curtain components 38 respectively meet one another with their third planar front surface 52. In FIG. 4d, the left-hand light curtain component adjoins the first planar front surface 48" of the right-hand light curtain component 38 with its third planar front surface 52. In this way, an orientation of two light curtain components 38 at an angle of e.g. 45° can thus also be achieved.

As is apparent from comparison of FIGS. 4b-4d, irrespective thereof the same distance $d_2$ is respectively maintained between the two "last" emission or reception elements 28, 30 as that which they have from the emission or reception elements 28, 30, next to them, of the respectively same light curtain component 38.

FIG. 5 shows a light curtain rail 26, at the ends of which light curtain components 38 according to the present disclosure are mounted. The light curtain components 38 in this case function as so-called end caps. The light curtain components 38 shown in FIG. 5 correspond to the third embodiment shown in FIG. 4. In principle, however, the light curtain components 38 according to the first two embodiments shown in FIGS. 2 and 3 may also be used as end caps.

Figure 5A:
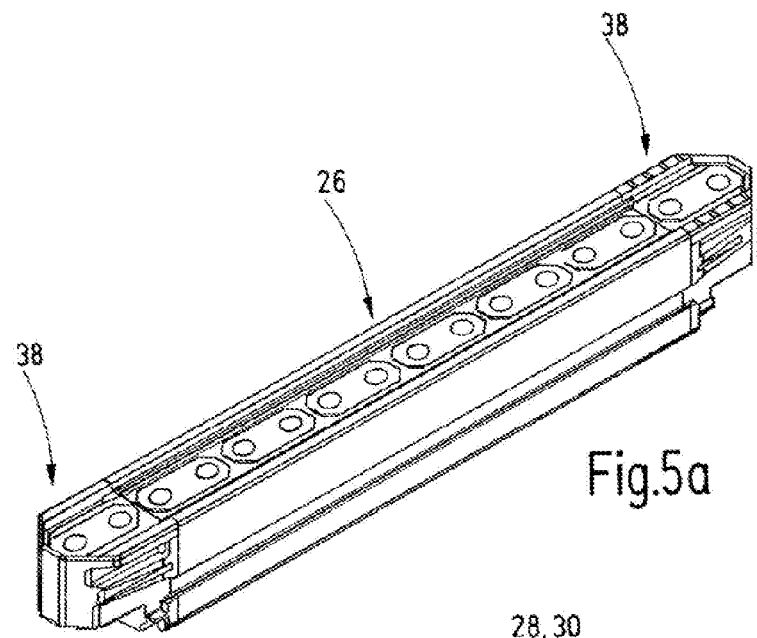
FIG. 5a shows a perspective representation of a light curtain rail having the light curtain component according to the present invention as an endpiece.
Figure 5B:
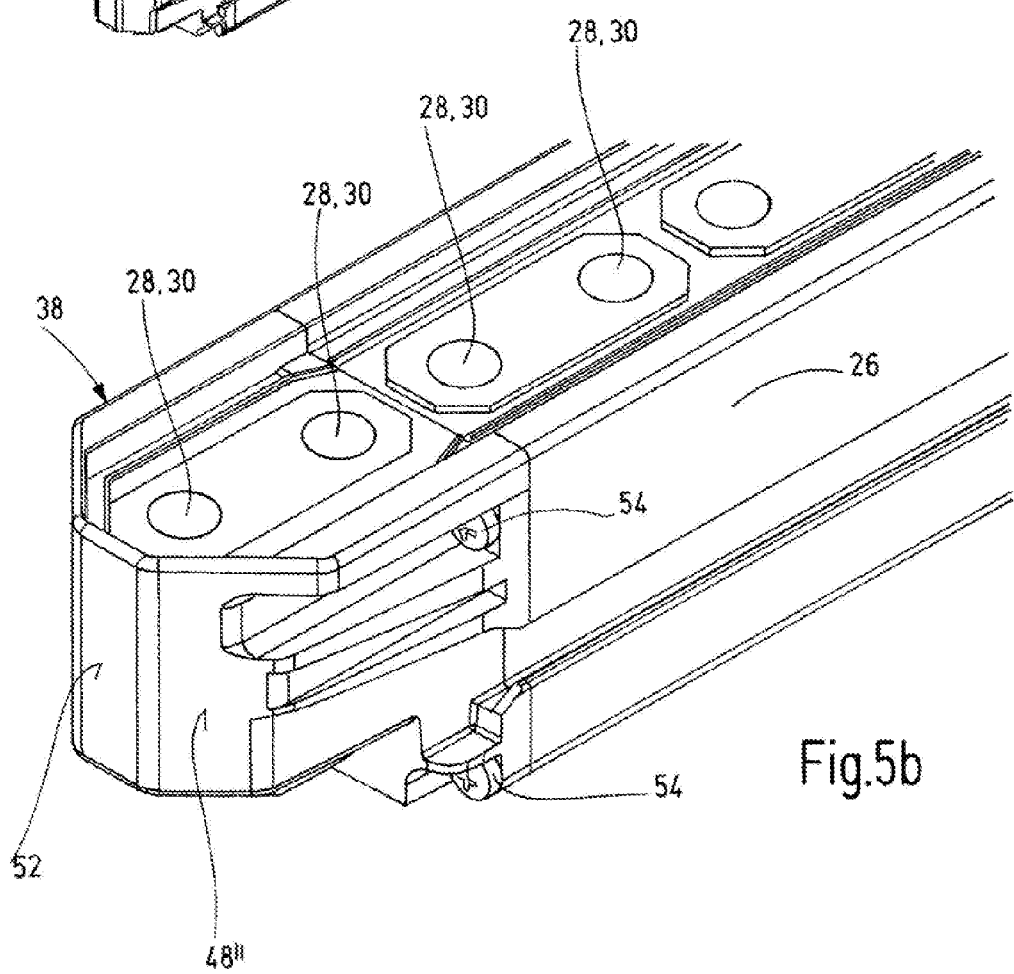
Figure 6:
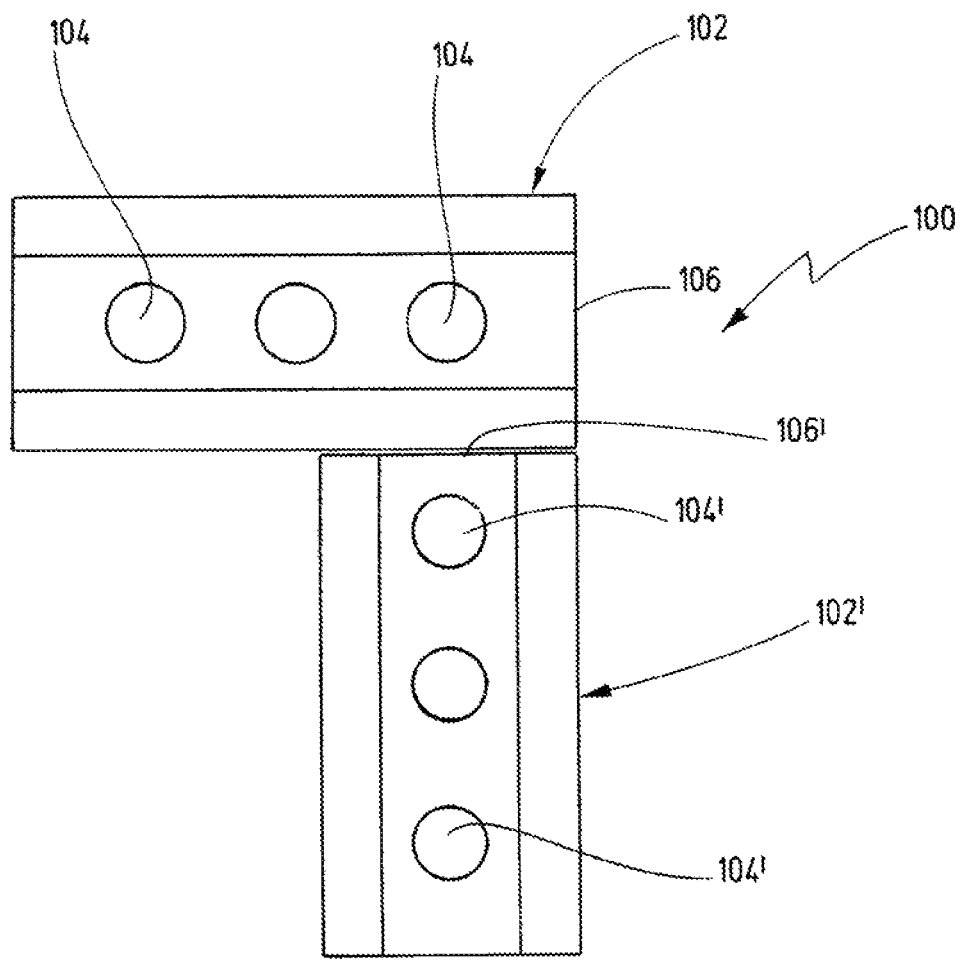
FIG. 6 shows a schematic representation of a light curtain component known from the prior art.

FIG. 5a shows a perspective overview representation. FIG. 5b shows a detail view. As can be seen from FIG. 5b, the light curtain component 38 is preferably screwed onto the light curtain rail 26 with the aid of screws 54. Instead of a screw connection, this connection could of course also be carried out by another fastening means, for example by a plug-in connection or by a groove/featherkey connection. The light curtain components 38 may thus be mounted on the ends of light curtain rails 26 of different design and different length. In this case, they function so to speak as connection pieces to further light curtain rails 26, in order to produce a light curtain frame 24, as shown schematically and by way of example in FIG. 1.

What is claimed is:
1. A light curtain component, comprising:
a housing which extends essentially along a longitudinal direction, wherein the housing comprises an upper side, which extends parallel to the longitudinal direction, and a front side, which extends transversely to the upper side, and
a plurality of optoelectronic emission or reception elements which are arranged in the housing and are oriented toward the upper side of the housing, wherein the plurality of optoelectronic emission or reception elements are separated from one another along the longitudinal direction, wherein the housing further comprises, on the front side, a first planar front surface, a second planar front surface, and a third planar front surface, wherein the first planar front surface extends transversely to the upper side and is arranged at an angle of 45° with respect to the longitudinal direction, wherein the second planar front surface extends transversely to the upper side and is arranged at an angle of 45° with respect to the longitudinal direction, wherein the third planar front surface extends transversely to the upper side and is oriented orthogonally to the longitudinal direction, and wherein third planar front surface is arranged locally in between the first planar front surface and the second planar front surface, such that the front side has an essentially trapezoidal shape in a plan view, and wherein one of the optoelectronic emission or reception elements, which is arranged in the housing spatially closest to the front side, has an equally large first distance from each of the first, the second and the third planar front surface, and wherein said first distance is at most half as large as a second distance between two optoelectronic emission or reception elements being arranged directly next to one another in the housing.

2. The light curtain component as claimed in claim 1, wherein the first distance is half as large as the second distance.

3. The light curtain component as claimed in claim 1, wherein the light curtain component is configured as a removable endpiece of a light curtain rail, and comprises at least one connecting element for connection to such a light curtain rail.

4. A light curtain component, comprising:
a housing which extends essentially along a longitudinal direction, wherein the housing comprises an upper side, which extends parallel to the longitudinal direction, and a front side, which extends transversely to the upper side, and a plurality of optoelectronic emission or reception elements which are arranged in the housing and are oriented toward the upper side of the housing, wherein the plurality of optoelectronic emission or reception elements are separated from one another along the longitudinal direction, wherein the housing further comprises, on the front side, a first planar front surface and a second planar front surface, wherein the first planar front surface extends transversely to the upper side and is arranged at an angle of 45° with respect to the longitudinal direction, wherein the second planar front surface extends transversely to the upper side and is arranged at an angle of 45° with respect to the longitudinal direction, and wherein the second planar front surface extends orthogonally to the first planar front surface, and wherein one of the optoelectronic emission or reception elements, which is arranged in the housing spatially closest to the front side, has an equally large first distance from each of the first planar front surface and the second planar front surface, and wherein said first distance is at most half as large as a second distance between two optoelectronic emission or reception elements being arranged directly next to one another in the housing.

5. The light curtain component as claimed in claim 4, wherein the first planar front surface and the second planar front surface are arranged directly adjacent to one another, such that a straight edge is formed at a transition between the first planar front surface and the second planar front surface.

6. The light curtain component as claimed in claim 4, wherein the first distance is half as large as the second distance.

7. The light curtain component as claimed in claim 4, wherein the light curtain component is configured as a removable endpiece of a light curtain rail, and comprises at least one connecting element for connection to such a light curtain rail.

8. A light curtain component, comprising:
a housing which extends essentially along a longitudinal direction, wherein the housing comprises an upper side, which extends parallel to the longitudinal direction, and a front side, which extends transversely to the upper side, and a plurality of optoelectronic emission or reception elements which are arranged in the housing and are oriented toward the upper side of the housing, wherein the plurality of optoelectronic emission or reception elements are separated from one another along the longitudinal direction, wherein the further housing comprises, on the front side, a first planar front surface, wherein the first planar front surface extends transversely to the upper side and is arranged at an angle of 45° with respect to the longitudinal direction, and wherein one of the optoelectronic emission or reception elements, which is arranged in the housing spatially closest to the front side, has a first distance from the first planar front surface, and wherein said first distance is at most half as large as a second distance between two optoelectronic emission or reception elements being arranged directly next to one another in the housing.

9. The light curtain component as claimed in claim 8, wherein the first distance is half as large as the second distance.

10. The light curtain component as claimed in claim 8, wherein the housing furthermore comprises, on the front side, a second planar front surface which extends transversely to the upper side and is arranged at an angle of less than 90° with respect to the longitudinal direction.

11. The light curtain component as claimed in claim 10, wherein the angle between the longitudinal direction and the second planar front surface is 45°.

12. The light curtain component as claimed in claim 10, wherein a distance between the second planar front surface and one of the optoelectronic emission or reception elements, which is arranged in the housing and lies spatially closest to the front side, equals the first distance.

13. The light curtain component as claimed in claim 10, wherein the housing further comprises, on the front side, a third planar front surface which extends transversely to the upper side, is oriented orthogonally to the longitudinal direction, and connects the first planar front surface and the second planar front surface to one another.

14. The light curtain component as claimed in claim 13, wherein the front side is essentially trapezoidal in a plan view.

15. The light curtain component as claimed in claim 13, wherein a distance between the third planar front surface and one of the optoelectronic emission or reception elements, which is arranged in the housing and lies spatially closest to the front side, equals the first distance.

16. The light curtain component as claimed in claim 8, wherein the light curtain component is configured as a removable endpiece of a light curtain rail, and comprises at least one connecting element for connection to such a light curtain rail.

\* \* \* \* \*